(12) United States Patent
Hwang et al.

(10) Patent No.: US 9,851,924 B2
(45) Date of Patent: Dec. 26, 2017

(54) USING HARD DRIVE ON PANELS FOR DATA STORAGE

(71) Applicant: Vivint, Inc., Provo, UT (US)

(72) Inventors: Jungtaik Hwang, Draper, UT (US); Matthew J. Eyring, Provo, UT (US); Jeremy B. Warren, Draper, UT (US); James Ellis Nye, Alpine, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 15/425,378

(22) Filed: Feb. 6, 2017

(65) Prior Publication Data

US 2017/0212688 A1    Jul. 27, 2017

Related U.S. Application Data

(63) Continuation of application No. 14/245,340, filed on Apr. 4, 2014, now Pat. No. 9,563,372.

(51) Int. Cl.
*G06F 13/00* (2006.01)
*G06F 3/06* (2006.01)
*G06F 17/27* (2006.01)
*G06F 17/22* (2006.01)
*G06F 11/14* (2006.01)
*G06F 21/62* (2013.01)

(52) U.S. Cl.
CPC .......... *G06F 3/067* (2013.01); *G06F 3/0623* (2013.01); *G06F 11/1456* (2013.01); *G06F 11/1464* (2013.01); *G06F 17/2258* (2013.01); *G06F 17/272* (2013.01); *G06F 21/6218* (2013.01)

(58) Field of Classification Search
None
See application file for complete search history.

(56) References Cited

U.S. PATENT DOCUMENTS

| 2002/0031101 | A1 | 3/2002 | Petite et al. |
| 2007/0281664 | A1* | 12/2007 | Kaneko ................ G06F 21/88 455/410 |
| 2008/0126357 | A1 | 5/2008 | Casanova et al. |
| 2011/0107103 | A1* | 5/2011 | Dehaan ............... G06F 11/1456 713/171 |

(Continued)

FOREIGN PATENT DOCUMENTS

WO    2007005390 A2    1/2007

OTHER PUBLICATIONS

International Search Report and Written Opinion of the International Searching Authority for PCT/US2015/024801, dated Jun. 17, 2015.

*Primary Examiner* — Sean D Rossiter
(74) *Attorney, Agent, or Firm* — Holland & Hart LLP

(57) ABSTRACT

Methods and systems are described for controlling an automation and security system. According to at least one embodiment, an apparatus for data storage in an automation and security system includes a processor, a memory in electronic communication with the processor, and instructions stored in the memory. The instructions are executable by a processor to receive data at a first device, store a copy of the data on the first device, fragment the data into a plurality of data fragments, transmit the plurality of data fragments to a plurality of remote devices, and store some of the plurality of data fragments on each of the plurality of remote devices.

20 Claims, 10 Drawing Sheets

(56) References Cited

U.S. PATENT DOCUMENTS

| | | | |
|---|---|---|---|
| 2013/0275695 A1* | 10/2013 | Ponsford | G06F 11/1448 711/162 |
| 2015/0160935 A1* | 6/2015 | Nye | H04L 41/0806 717/178 |
| 2016/0121479 A1* | 5/2016 | Lin | B25J 9/0003 700/264 |
| 2016/0123741 A1* | 5/2016 | Mountain | G01C 21/206 701/533 |

* cited by examiner

USING HARD DRIVE ON PANELS FOR DATA STORAGE

CROSS-REFERENCE TO RELATED APPLICATIONS

The present application is a continuation of U.S. patent application Ser. No. 14/245,340, titled: "Using Hard Drive on Panels for Data Storage", filed on Apr. 4, 2014. The disclosure of which is incorporated by reference herein in its entirety.

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and security products. Advancements in mobile devices allow users to monitor and/or control an aspect of a home or business. As home automation and security products expand to encompass other systems and functionality in the home, opportunities exist for using the control panel of the automation and security systems for alternative purposes. Furthermore, the network of home automation and security systems within a defined geographic area may be leveraged to provide advantages for home and business owners.

SUMMARY

Methods and systems are described for data storage such as backup data storage. According to at least one embodiment, an apparatus for data storage includes a processor, a memory in electronic communication with the processor, and instructions stored in the memory which are executable by a processor to receive data at a first device, store a copy of the data on the first device, fragment the data into a plurality of data fragments, transmit the plurality of data fragments to a plurality of remote devices, and store some of the plurality of data fragments on each of the plurality of remote devices.

In one embodiment, the first device and the plurality of remote devices are control panels for automation and security systems. Each of the plurality of remote devices may include storage having a portion thereof dedicated to storing data fragments from remote devices. The plurality of data fragments may be transmitted over a wireless network. The instructions may be executable by the processor to request the data fragments from the plurality of remote devices and reassemble the data fragments.

In another embodiment, receiving the data at the first device may include receiving the data wirelessly from a local computing device. The instructions may be executable by the processor to receive instructions from a remotely positioned control platform for fragmenting the data. The instructions may be executable by the processor to store another copy of the data at a further remote device. The further remote device may be a remote server such as a cloud storage device.

According to another embodiment, a computer-program product for backup data storage in an automation and security system includes a non-transitory computer-readable medium storing instructions executable by a processor to receive data from a computing device, store a first copy of the data in a first control panel of the automation and security system, fragment a second copy of the data into a plurality of data fragments, and store the plurality of data fragments on a plurality of remotely positioned control panels located within a defined geographic area adjacent to the first control panel.

In one embodiment, the computing device and the first control panel may be located on a property monitored by the automation and security system. The instructions may be executable by the processor to deliver the data from the computing device to the first control panel wirelessly, and deliver the plurality of data fragments to the plurality of remote control panels wirelessly. The instructions may be executable by the processor to reassemble the plurality of data fragments at the first control panel. The instructions may be executable by the processor to transmit the plurality of data fragments from the first control panel to the plurality of remote control panels. The instructions may be executable by the processor to transmit the plurality of data fragments to the plurality of remote control panels via a first network, and transmit a third copy of the data to a cloud storage device via a second network that is separate from the first network.

Another embodiment relates to a computer-implemented method for backup data storage in an automation and security system. The method includes receiving data from a computing device, storing a copy of the data on a first storage device, fragmenting the data into a plurality of data fragments, and storing the plurality of data fragments on a plurality of remote storage devices.

In another embodiment, the method includes retrieving the plurality of data fragments from the plurality of remote storage devices, and reassembling the plurality of data fragments. The method may include receiving instructions from a remotely located control platform about how to fragment the data into the plurality of data fragments and where to store the plurality of data fragments on the plurality of remote storage devices. Storing the copy of the data may include storing in a first portion of the first storage device, and a second portion of the first storage device is dedicated for storage of data fragments from the plurality of remote storage devices.

A further embodiment relates to a computer-implemented method for backup data storage in an automation and security system. The method includes receiving a request for backup data storage from a first control panel located at a first property, transmitting instructions to the first control panel for fragmenting the data into a plurality of data fragments and delivery of the plurality of data fragments to a plurality of secondary control panels located on properties remote from the first property, receiving a request for reassembly of the data, and transmitting instructions to the first control panel for reassembly of the data fragments from the plurality of secondary control panels.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
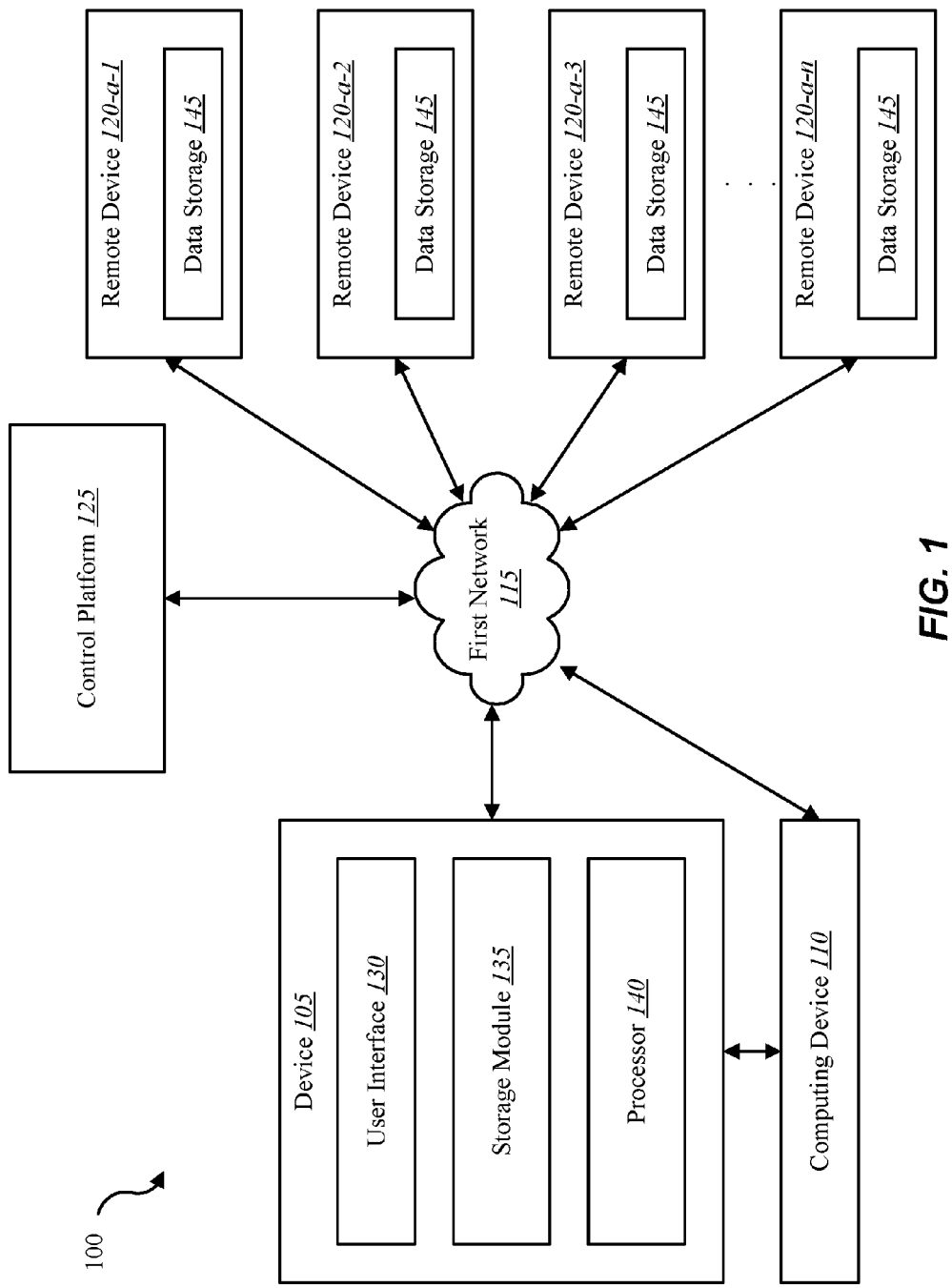
FIG. 1 is a block diagram of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

At least some of the systems and methods described herein relate to home automation and home security, and related security systems and automation for use in commercial and business settings. For example, the systems and methods described herein may relate to data storage for automation and security system used in home, commercial and business settings. Other aspects of the present disclosure relate generally to data storage, and, in particular, backup data storage. The systems and methods described herein may provide for storage of multiple copies of data, and may utilize local and remote storage devices for storing the various copies or fragments of the data.

The data storage system and methods disclosed herein may have particular relevance to automation and security systems, but should not be limited to such applications. In an example automation and security system, the hard drive of a control panel of the automation and security system may be used for storing data generated on or associated with the property monitored by the automation and security system. For example, a person may use a computing device such as a laptop computer on the property and the laptop computer may communicate with the control panel to store data generated on or managed by the laptop computer on the control panel. A portion of the control panel hard drive or other data storage device may be dedicated to such storage functions. Other portions of the hard drive may be dedicated to functions of the automation and security system. In other examples, the data stored on the control panel may be data related to functions of the automation and security system itself.

In addition to storing data from any source associated with the property or computing devices used on the property where the control panel resides, the systems and methods disclosed herein may also provide for storing of an additional backup copy at locations remote from the property. For example, the data may be encrypted (e.g., fragmented, disassembled or separated into a plurality of data fragments, segments or shards) and transferred to one or more devices at a remote location for storage. The remote devices may include control panels for other automation and security systems on other properties. The other properties may be in relatively close proximity such as within the same neighborhood, community, or general geographic area (e.g., within a 0.5 mile to 10 mile radius). The remote control panels may each have a hard drive or other data storage capability having a portion thereof that is dedicated to storing data fragments of a backup copy of data from other remotely positioned control panels or automation and security system.

In further examples, another copy of the data may be stored at other types of remote devices or locations such as, for example, a cloud storage device available via a communication network such as the Internet. The data may be encrypted or unencrypted when stored to such alternative remote storage devices. Different types of networks may be used for communication with the remote storage devices. As mentioned above, the Internet may be used for communication with a cloud storage device. The remotely positioned control panels mentioned above may be accessible through a wireless network or wireless node shared by the automation and security systems for each of the properties associated with the control panels.

Instructions for determining how data should be encrypted (e.g., fragmented) and where the data fragments or other copies of the data should be stored may be provided via software of the control panel on the local property. Alternatively, the instructions may be received from a remotely positioned control platform such as a control platform used to manage and control the automation and security systems associated with the control panels. The remotely positioned control platform may be accessible through the same network used to communicate between the local control panel and the remotely positioned control panels or other remote storage devices. Alternatively, the control platform may communicate with the local control panel via a different network than that which is used to communicate between the local control panel and the remotely positioned control panels. Furthermore, the computing device or other system or device used to generate the data to be stored on the local panel or stored as backup data in remotely positioned devices may communicate with the local control panel via the same network used to communicate between the local control panel and the remote control panels. Alternatively, the data generating device (e.g., personal computing device) may communicate directly with the local control panel via, for example, a wired or wireless communication system.

FIG. 1 is a block diagram illustrating one embodiment of an environment 100 in which the present systems and methods may be implemented. In some embodiments, the systems and methods described herein may be performed at least in part on or using a remote management device 105 (e.g., a control panel). The environment 100 may include the device 105, a computing device 110, a network 115, a plurality of remote devices 120-a, and a control platform 125. The computing device 105may generate data to be stored and may be in communication with the device 105directly or via the network 115. The computing device 105may include, for example, a personal computer, a laptop, a notebook, a netbook, a smart phone, television receiver, game console, or other media device. The remote devices 120-a and the control platform 125 may also be in communication with the device 105 and/or with each other through the network 115.

The network 115 provides communication via, for example, wired or wireless connections. Further, the network 115may include a plurality of communication mediums. For example, network 115may include different communication mediums to provide communication between computing device 110 and device 105, between remote devices 120-a and device 105, and between control platform 125 and device 105. Examples of network 115includes cloud networks, local area networks (LAN), wide area networks (WAN), virtual private networks (VPN), wireless networks (using 802.11, for example), and/or cellular networks (using 3G and/or LTE, for example), etc. In some embodiments, the network 115 may include the Internet.

In some embodiments, the remote management device 105 is a portable electronic device with a touch screen display. The device 105 may be in communication with one or more sensors. A sensor may include, for example, a camera sensor, audio sensor, forced entry sensor, shock sensor, proximity sensor, boundary sensor, appliance sensor, light fixture sensor, temperature sensor, light beam sensor, three-dimensional (3-D) sensor, motion sensor, smoke sensor, glass break sensor, door sensor, window sensor, carbon monoxide sensor, accelerometer, global positioning system (GPS) sensor, Wi-Fi positioning system sensor, capacitance sensor, radio frequency sensor, near-field sensor, heartbeat sensor, breathing sensor, oxygen sensor, carbon dioxide sensor, brain wave sensor, movement sensor, voice sensor, and the like.

In some configurations, device 105 may include components such as a user interface 130, a storage module 135, and a processor 140. Although the components of device 105 are depicted as being internal to device 105, it is understood that one or more of the components may be external to the device 105 and connect to device 105 through wired and/or wireless connections. For example, one or more components (e.g., software, firmware, and/or hardware) of storage module 135 may be located, installed, and/or part of other components and/or systems of environment 100.

The storage module 135 may operate to provide storage of data provided by computing device 110 or data generated by device 105 itself. Storage module 135 may include data storage capability (e.g., a hard drive) for storage of a copy of data received from computing device 110 or other source, and may facilitate storage of other copies of the data on at least one of the remote devices 120-a. For example, computing device 110 may transmit data to device 105 in the form of a video file. Storage module 135 may store a copy of the video file on a hard drive or other data storage medium of device 110. Storage module 135 may also, or alternatively, transmit a copy of the video file to one or more of the remote devices 120-a, wherein the remote devices 120-a store the video file or portions thereof on data storage 145.

The remote devices 120-a may be a control panel of an automation and security system of a property in relatively close proximity to the property that hosts device 105. For example, device 105 and remote devices 120-a-1 to 120-a-n may be part of or communicate via a local wireless network (also referred to as a wireless node, and which may be part of network 115) having geographic boundaries of, for example, a neighborhood, subdivision, business development, or community. In some examples, the geographic boundary has a radius of about 0.2 miles to about 10 miles, but may be larger or smaller depending on a number of factors. The local wireless network may operate independent of the Internet and other communication mediums in use within the geographic boundaries. The local wireless network may provide data transfer at significantly higher rates than other communication mediums such as cloud storage available via the Internet.

The storage module 135, alone or in cooperation with processor 140, may fragment the data from computing device 110 prior to distributing the data to remote devices 120-a. The fragmentation of the data may be implemented using various encryption and security techniques. The resulting data fragments (also referred to as data shards or data segments) may be delivered to and separately stored on any single remote device 120-a, or may be delivered to and stored on a plurality of remote devices 120-a. The data fragments may be relatively useless when stored separately and individually, and provide utility only when recombined or reassembled with the remaining data fragments. Fragmentation of the data may provide desired security of the data stored on remote devices 120-a The reassembling of the data fragments may occur if, for example, the copy of the data stored on device 105 is destroyed or made unavailable. A house fire, flood, electrical surge, virus, or natural disaster may eliminate the data stored on device 105 or the device 105 completely. The backup copy of the data stored as data fragments on the remote devices 120-a may be reassembled on a replacement device 120.

Instructions for fragmenting, transferring, storing, collecting, and reassembling the data may be stored on device 105 or may be provided by control platform 125. Control platform 125 may include or be part of, for example, a remote control center for an automation and security system. In one embodiment, the device 105, after receiving data (e.g., from computing device 110), requests instructions from control platform 125 (e.g., via network 115) regarding storage of the data. Control platform 125 may send instructions to device 105 (e.g., via network 115) to store a first copy of the data on device 105, fragment a second copy of the data, and send the fragmented data to at least one of the remote devices 120-a (e.g., via network 115) as a backup copy of the data. Storage module 135 may be used to communicate between device 105 and control platform 125, store the first copy of the data on device 105, fragment the second copy of the data, and communicate the fragmented data to the remote devices 120-a. Alternatively, the instructions for data storage may be stored on device 105.

Figure 2:
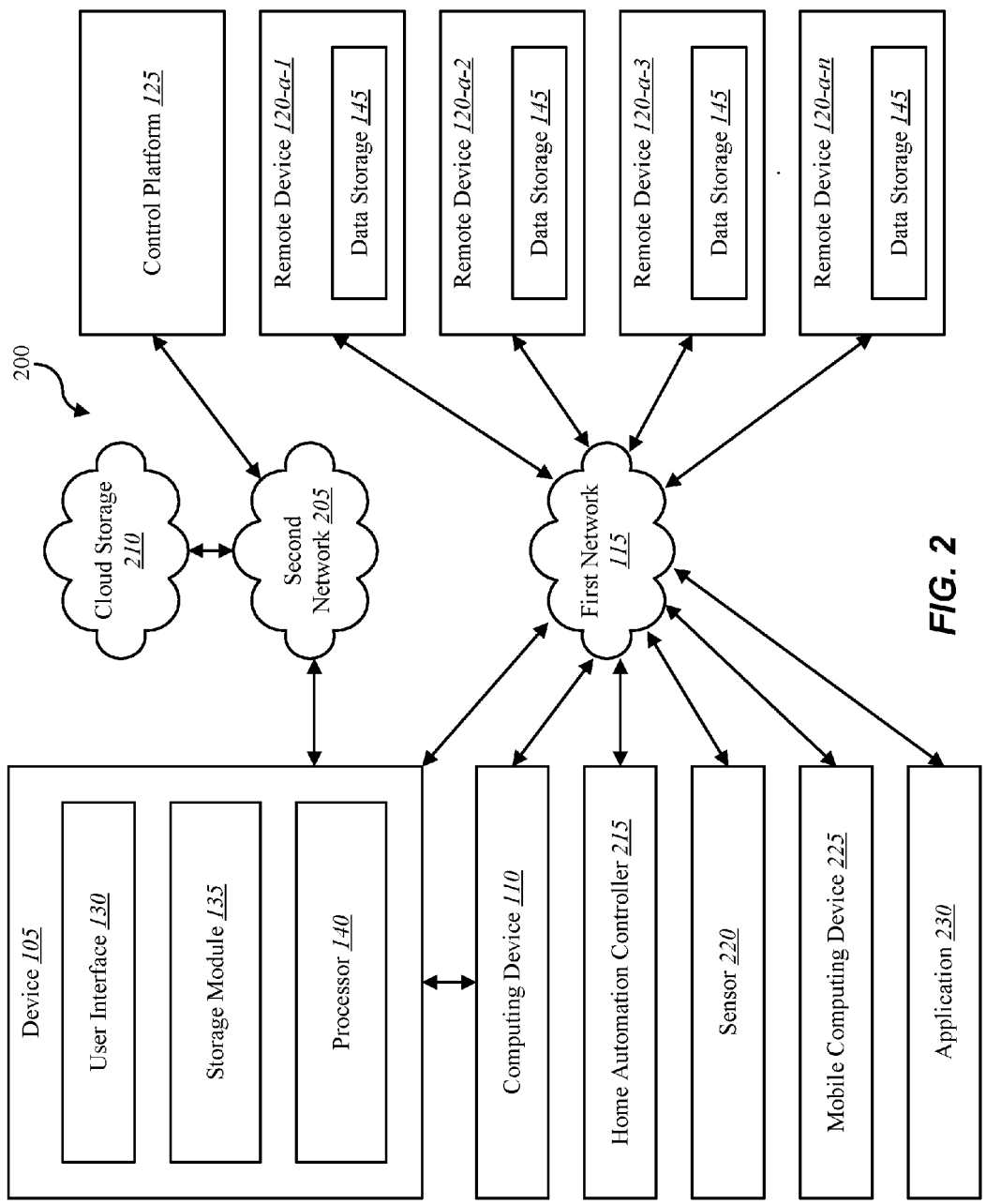
FIG. 2 is a block diagram of another environment in which the present systems and methods may be implemented.

Referring now to FIG. 2, in some embodiments, an environment 200 may include the components of environment 100 described above, and may further include a second network 205, cloud storage 210, a home automation controller 215, a sensor 220, a mobile computing device 225, and an application 230.

The second network 205 may be one example of the first network 115 depicted in FIG. 1 and described above. Second network 205 may include a different communication medium than that used for first network 115. For example, first network 115 may include a local wireless network that provides communications between components of the property in which device 105 resides (e.g., computing device 110, sensor 220, application 230, etc.) and/or communication between device 105 and remote devices 120-a. Second network 205 may include the Internet to provide communication between device 105 and control platform 125 and/or communication between device 105 and cloud storage 210. Data transfer speeds for first network 115 may be significantly faster than for second network. In at least some examples, first network 115 has data transfer speeds at least an order of magnitude higher than that of second network 205. Saving a backup copy of the data using first network 115 may be prioritized over using second network 205.

Environment 200 may store copies of the data on device 105 and on remote devices 120-a as described above related to environment 100. Environment 200 may store an additional copy of the data on a further remote device or system separate from the remote devices 120-a, such as cloud storage 210 (also referred to as a cloud network or cloud server). Device 105 and/or control platform 125 may provide instructions to store a copy of the data on cloud storage 210 at any time relative to storage of data on device 105 and/or remote devices 120-a. In embodiments where data transfer speeds are much higher via first network 115, data is stored on device 105 and remote devices 120-a more frequently and/or prior to storing a copy of the data on cloud storage 210 or other remote storage devices. Storing data on cloud storage 210 may be performed when other functionality and/or operation of environment 200 is dormant.

Sensor 220 shown in FIG. 2 may represent one or more separate sensors or a combination of two or more sensors in a single sensor device. For example, sensor 220 may represent one or more camera sensors and one or more motion sensors connected to environment 200. Additionally, or alternatively, sensor 220 may represent a combination sensor such as both a camera sensor and a motion sensor integrated in the same sensor device. Although sensor 220 is depicted as connecting to device 105-a over network 115, in some embodiments, sensor 220 may connect directly to device 105-a. Additionally, or alternatively, sensor 220 may be integrated with a home appliance or fixture such as a light bulb fixture. Sensor 220 may include an accelerometer to enable sensor 220 to detect a movement. Sensor 220 may include a wireless communication device enabling sensor 220 to send and receive data and/or information to and from one or more devices in environment 200. Additionally, or alternatively, sensor 220 may include a GPS sensor to enable sensor 220 to track a location of sensor 220. Sensor 220 may include a proximity sensor to enable sensor to detect proximity of a user relative to a predetermined distance from a dwelling (e.g., geo-fencing). Sensor 220 may include one or more security detection sensors such as, for example, a glass break sensor, a motion detection sensor, or both. Additionally, or alternatively, sensor 220 may include a smoke detection sensor, a carbon monoxide sensor, or both. The data saved as described herein may be data collected by sensor 220.

In some embodiments, mobile computing device 225 may include a television set. Additionally, or alternatively, mobile computing device 225 may include one or more processors, one or more memory devices, and/or a storage device. Examples of mobile computing device 225 may include a viewing device associated with a media content set top box, satellite set top box, cable set top box, DVRs, personal video recorders (PVRs), and/or mobile computing devices, smart phones, personal computing devices, computers, servers, etc. In at least some examples, the computing device 110 may include or be exchangeable with mobile computing device 225.

Application 230 may allow a user to control (either directly or via home automation controller 215) an aspect of the monitored property, including security, energy management, locking or unlocking a door, checking the status of a door, locating a user or item, controlling lighting, thermostat, cameras, receiving notification regarding a current status or anomaly associated with a home, office, place of business, and the like. In some configurations, application 230 may enable device 105 to interface with home automation controller 215 and provide the user interface 130 to display automation, security, and/or energy management content on device 105 and/or mobile computing device 225. Thus, application 230, via the user interface 130, may allow users to control aspects of their home, office, and/or other type of property. Further, application 230 may be installed on mobile computing device 225 in order to allow a user to interface with a function of device 105 or home automation controller 215. Information or data associated with application 230 and its operation may be saved according to the data storage methods described herein.

In some embodiments, a user may access the functions of device 105 and/or home automation controller 215 from mobile computing device 225. For example, in some embodiments, mobile computing device 225 includes a mobile application that interfaces with one or more functions of device 105 and/or home automation controller 215. Examples of the home automation controller 215 may include a dedicated home automation computing device (e.g., wall-mounted controller), a personal computing device (e.g., laptop, desktop, etc.), a mobile computing device (e.g., tablet computing device, smartphone, etc.), and the like. The computing device 110 may include or be integrated into the home automation controller 215 or mobile computing device 225. In some embodiments, device 105 may be integrated with home automation controller 215 in the form of one or more personal computing devices (e.g. mobile devices, smart phones, and/or personal computing devices) to both control aspects of a property as well as to receive and display notifications regarding monitored activity of a property.

Figure 3:
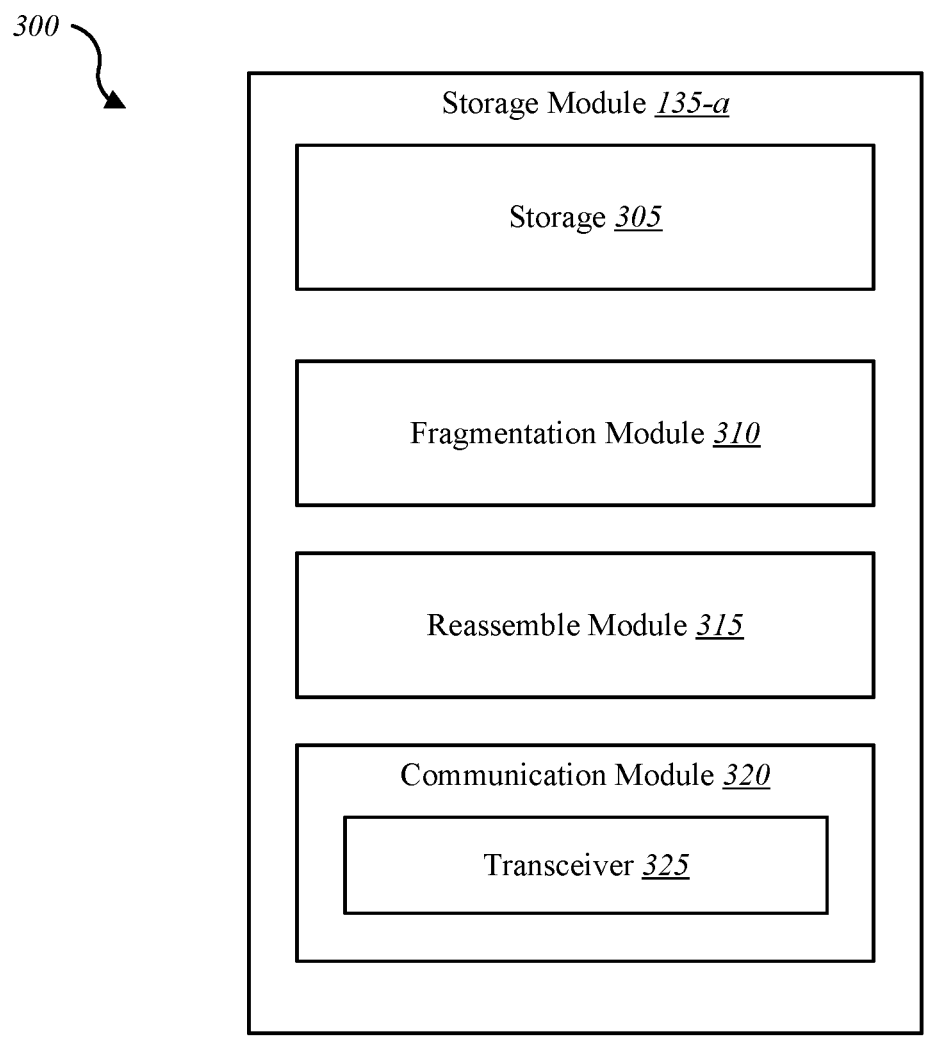
FIG. 3 is a block diagram of an example storage module of the environments shown in FIGS. 1 and 2.

FIG. 3 is a block diagram 300 illustrating one example of a storage module 135-a. Storage module 135-a may be one example of storage module 135 depicted in FIGS. 1 and/or 2. As depicted, storage module 135-a may include storage 305, a fragmentation module 310, a reassemble module 315, and a communication module 320. Communication module 320 may further include a transceiver 325. Storage module 135-a may include additional or fewer modules and capability in other embodiments. Similarly, fragmentation module 310, reassemble module 315, and communication module 320 may include additional modules and functionality than that which is described with reference to FIG. 3.

Storage 305 may provide dedicated space for storing data. Storage 305 may be in the form of a hard disc drive, but may be configured as any of a number of data storage devices or systems. Storage 305 may be partitioned into at least two segments or portions, wherein the first segment or portion stores data associated with the property wherein device 105 resides, and the other portion is dedicated to storing data from remote positioned devices such as remote devices 120-a. Storage 305 may provide data storage related to various functionality of device 105 and environment 100 generally.

Fragmentation module 310 may operate to encrypt or fragment data that is being stored in storage 305 or that is being transmitted to remote devices 120-a for storage. Fragmentation module 310 may receive instructions from, for example, processor 140 and device 105. Alternatively, instructions for fragmenting the data may be received from control platform 125 shown in FIGS. 1 and/or 2. The fragmented data may be coded with origination data such that the data fragments may be properly returned to the correct storage module 135 and/or device 105 for reassembly at a later time.

Reassemble module 315 may operate to reassemble the fragmented data. The fragmented data may be stored in storage 305 and then reassembled by reassemble module 315. Alternatively, the fragmented data may be delivered to and stored on remote devices 120-a, and upon return of the fragmented data, the reassemble module 315 may reassemble the data into a usable format. Reassemble module 315 may receive instructions for reassembly from, for example, processor 140 or other aspects of device 105. Alternatively, reassemble module 315 may receive instructions from control platform 125 shown in FIGS. 1 and/or 2.

Communication module 320 may provide communication between storage module 135-a and any one of the remote storage devices discussed herein. For example, communication module 320 may provide transmission of the data fragments generated by fragmentation module 310 and provide instructions therewith for storage of the data fragments on one or more of the remote devices 120-a of FIGS. 1 and/or 2 or the cloud storage 210 shown in FIG. 2. The transceiver 325 of communication module 320 may provide transmit and receive functionality for communication between device 105 and remote devices 120-a, control platform 125, and/or cloud storage 210 via either of the networks 115, 205 shown in FIGS. 1 and/or 2. Communication module 320 may send instructions to any of the remote devices 120-a and cloud storage 210 to return the data fragments or complete copies of the data stored on those remotely positioned devices in the event that the backup data is needed.

Figure 4:
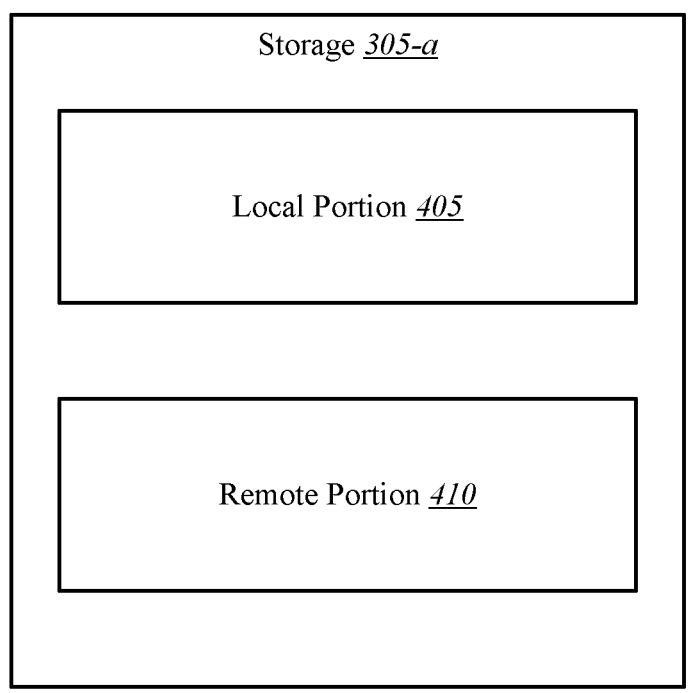
FIG. 4 is a block diagram of an example data storage of the storage module shown in FIG. 3.

FIG. 4 is a block diagram 400 illustrating another example of storage 305-a. Storage 305-a may be one example of storage 305 depicted in FIG. 1. As depicted, storage 305-a may include a local portion 405 and a remote portion 410. Local portion 405 may be dedicated to storing data associated with device 105 and/or computing device 110 and any other data associated with the property or users of the property where device 105 resides. Remote portion 410 may be dedicated to storing backup data for other devices such as any of remote devices 120-a shown in FIGS. 1 and/or 2.

In one example, storage 305-a has a capacity of 1 terabyte. Local portion 405 occupies about 700 gigabytes and remote portion 410 occupies about 300 gigabytes. The allocation of storage space for the local portion 405 and remote portion 410 may vary significantly depending on, for example, the local data storage demands and the backup storage demands for remote devices.

Figure 5:
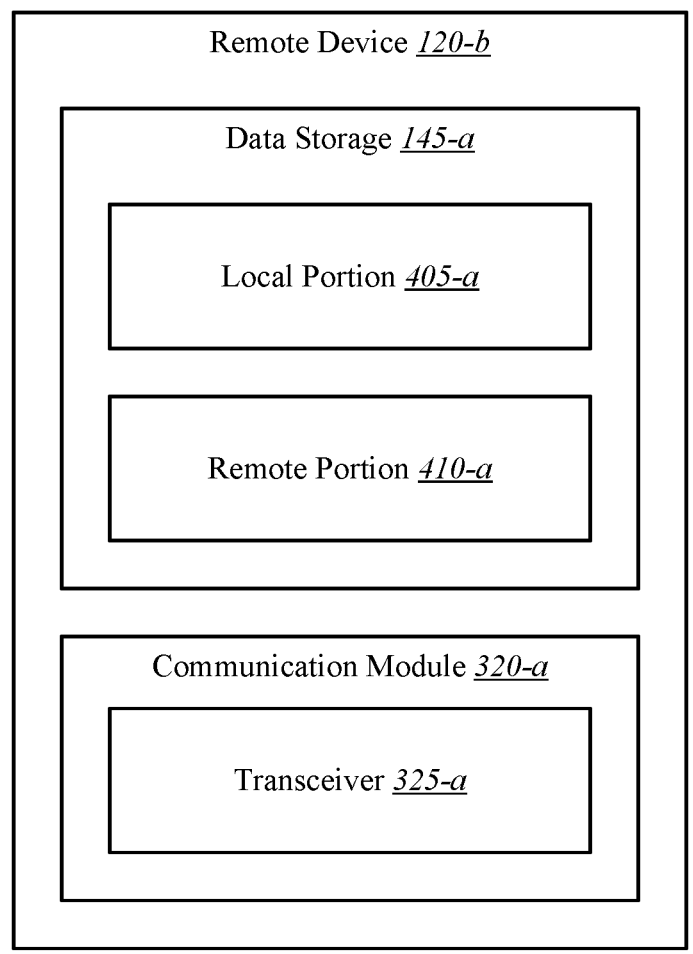
FIG. 5 is a block diagram of an example remote device of the environments shown in FIGS. 1 and 2.

FIG. 5 is a block diagram 500 illustrating an example remote device 120-b. Remote device 120-b may be one example of remote devices 120-a-1 through 120-a-n depicted in FIGS. 1 and/or 2. Remote device 120-b, as depicted, may include data storage 145-a and communication module 320-a. Data storage 145-a may be one example of the data storage 145 described above with reference to FIGS. 1 and/or 2, and may include a local portion 405-a and a remote portion 410-a, which may be examples of the local portion 405 and remote portion 410 described above with reference to FIG. 4. Communication module 320-a may include a transceiver 325-a, which may be one example of the transceiver 325 described above with reference to FIG. 3.

Local portion 405-a may be dedicated to storing data associated with remote device 120-b and the property managed by and associated with remote device 120-b. Remote portion 410-a may be dedicated to storing data from devices or systems that are located remote from remote device 128-b. In one example, data storage 145-a has a capacity of about 1 terabyte, local portion 405-a is allocated about 700 gigabytes and remote portion 410-a is allocated about 300 gigabyte. With this arrangement, in combination with the 1 terabyte capacity of storage 305-a described with reference to FIG. 4, three or more remote devices 120-b would be required to store backup data for storage 305 for the local portion 405 of storage 305-a (see FIG. 4) if local portion 405 is filled to its capacity of 700 gigabyte.

Communication module 320-a may provide communication with other devices such as any one of the remote devices 120-a and device 105 of FIGS. 1 and/or 2. The transceiver 325-a may provide transmit and receive capability for remote device 120-b.

The remote device 120-b may be configured to provide the data backup without the users of remote device 120-b being aware of its backup data capability. Furthermore, persons on the property where the remote device 120-b resides may be blocked from gaining access to the backup data being stored on remote portion 410-a, although even if such access were possible, the fragmented data stored on the remote device 120-a would be meaningless.

In one example use of the systems and methods described herein, a homeowner may store photographs in the storage module 135 of device 105 and remote portion 410-a may store a backup copy of the photographs in the data storage 145 of the remote devices 120-a as data fragments. An additional copy of the photographs may be stored on cloud storage 245. Subsequently, the copy stored on device 105 may be damaged or accessible to, for example, a house fire or flood. Device 105 may be replaced with a new device 105. Instructions may be given to return to device 105 the copy of the data stored on cloud storage 210 and/or return the copy (e.g., data fragments) stored on remote devices 120-a so that the user has at least one complete copy of the photographs restored for use.

As discussed above with reference to device 105 and remote devices 120-a, the remote device 120-b may be a control panel of an automation and security system. Remote device 120-b may include some or all of the features of device 105 described herein and may be associated with a separate automation and security system at a different location (e.g., different property) from device 105.

Figure 6:
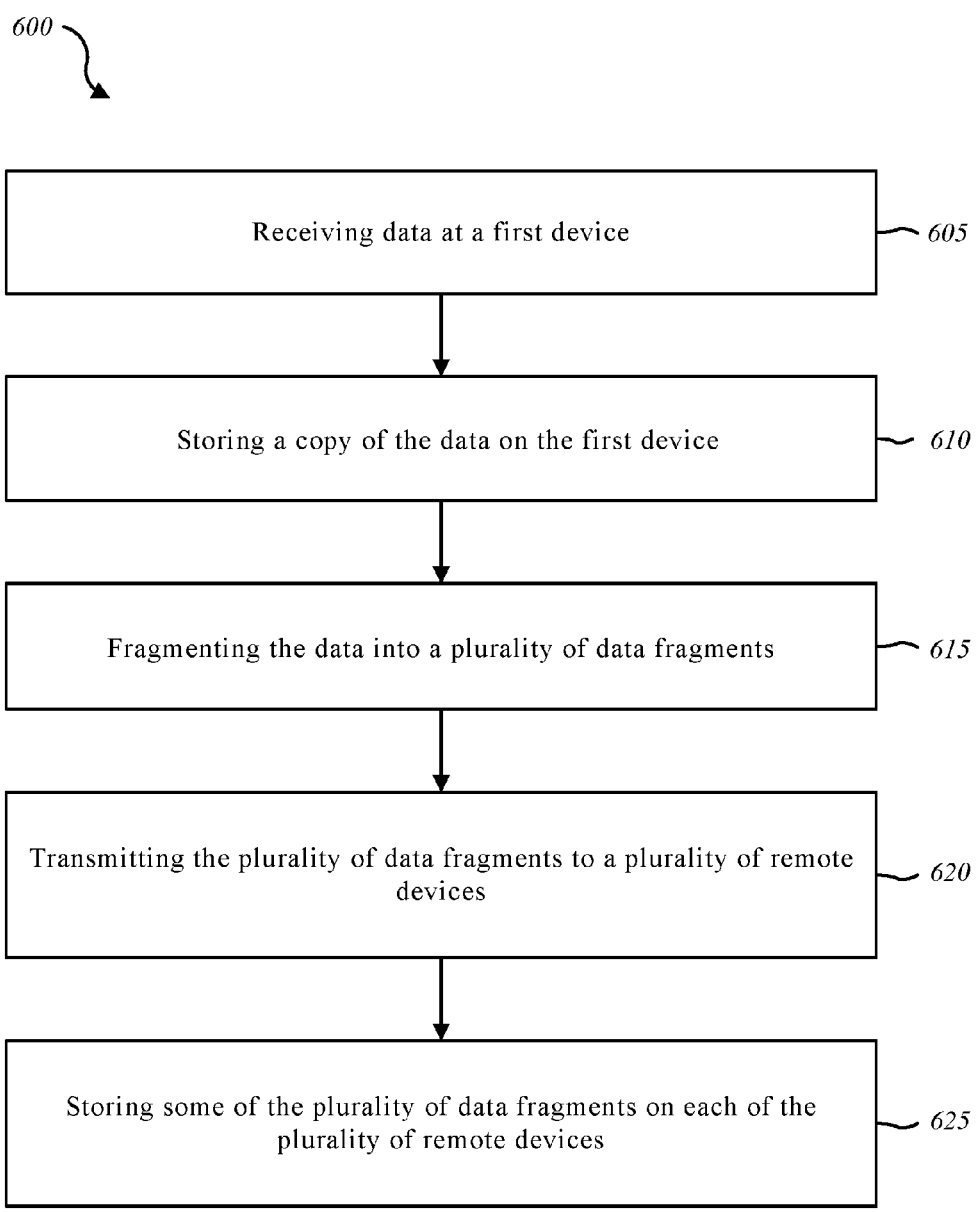
FIG. 6 is a flow diagram illustrating a method for data storage.

FIG. 6 is a flow diagram illustrating one embodiment of a method 600 for backup data storage, such as data storage in conjunction with an automation and security system. In some configurations, the method 600 may be implemented by the storage module 135 of device 105 shown in FIGS. 1, 2, and/or 3. In other examples, method 600 may be performed generally by device 105 shown in FIGS. 1 and/or 2, or even more generally by the environments 100, 200 shown in FIGS. 1 and/or 2.

At block 605, the method 600 includes receiving data at a first device. Block 610 includes storing a copy of the data on the first device. Block 615 includes fragmenting the data into a plurality of data fragments. Block 620 includes transmitting the plurality of data fragments to a plurality of remote devices. Block 625 includes storing some of the plurality of data fragments on each of the plurality of remote devices.

The first device and plurality of remote devices may include control panels of automation and security systems at each of a plurality of different properties being monitored by separate automation and security systems. The properties may be individual homes. The remote devices may be located at homes within relative close proximity to the home associated with the first device. The method may include storing another copy of the data on a yet further remote device such as, for example, a cloud storage device. The first device may communicate with a plurality of remote devices using a local wireless network or wireless node. The method may include transmitting data from, for example, a laptop, personal computer, or other electronic device to a first control panel.

Figure 7:
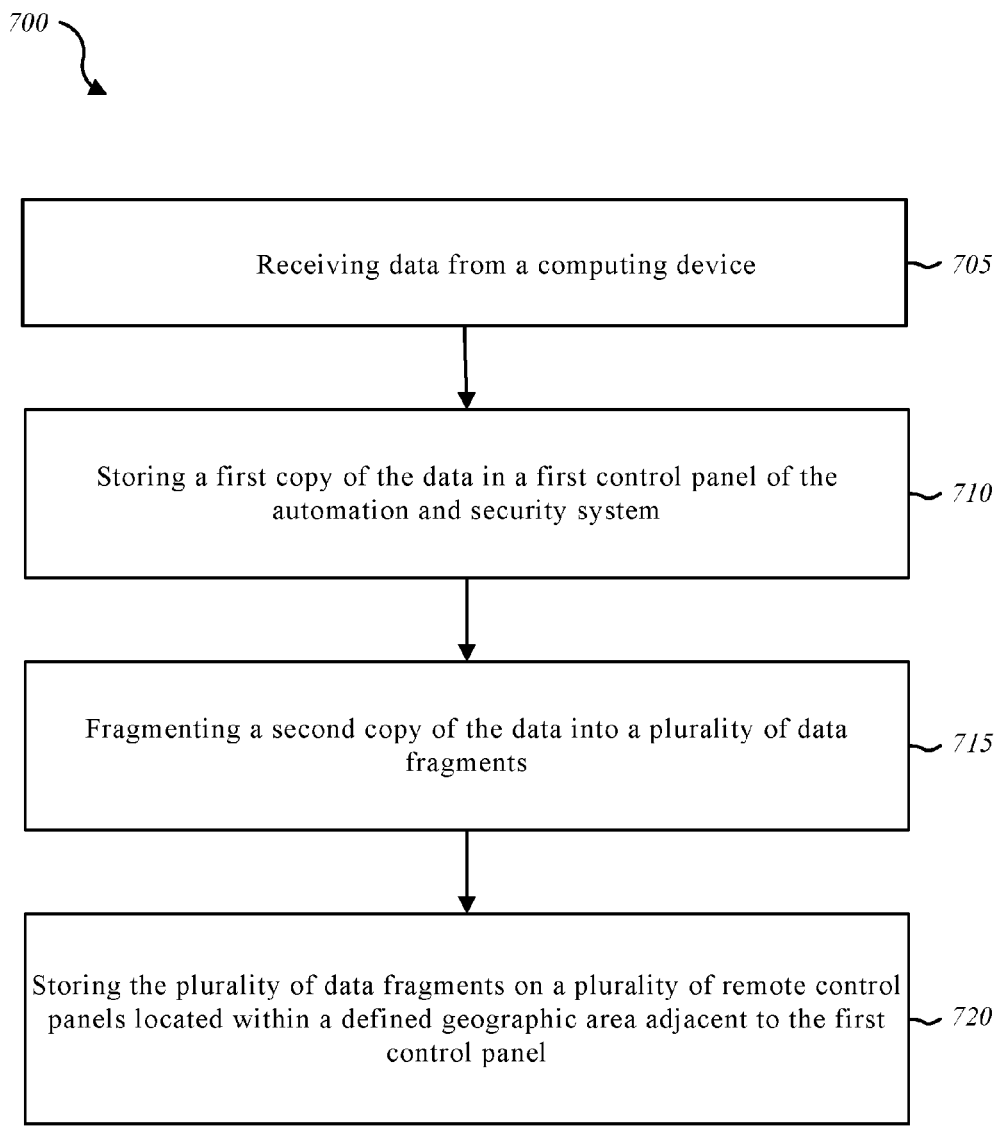
FIG. 7 is a flow diagram illustrating another method for data storage in an automation and security system.

FIG. 7 is a flow diagram illustrating one embodiment of a method 700 for backup data storage in an automation and security system. In some configurations, the method 700 may be implemented by the storage module 135 of device 105 shown in FIGS. 1, 2 and/or 3. In other examples, method 700 may be performed generally by device 105 shown in FIGS. 1 and/or 2, or even more generally by the environments 100 and 200 shown in FIGS. 1 and/or 2.

Block 710 of method 700 includes receiving data from a computing device. Block 715 includes fragmenting a second copy of the data into a plurality of data fragments. Block 715 includes storing a first copy of the data in the first control panel of an automation and security system. Block 720 includes storing the plurality of data fragments on a plurality of remotely located control panels that are located within a defined geographic area that covers the first control panel.

The computing device and first control panel may be located on a property monitored by the automation and security system. The method may further include reassembling the plurality of data fragments at the first control panel. A third copy of the data may be stored at a further remote data storage device such as, for example, a cloud storage device. The third copy may be transmitted via a separate network (e.g., the Internet) from a network used to communicate between the first control panel and the plurality of remote control panels.

Figure 8:
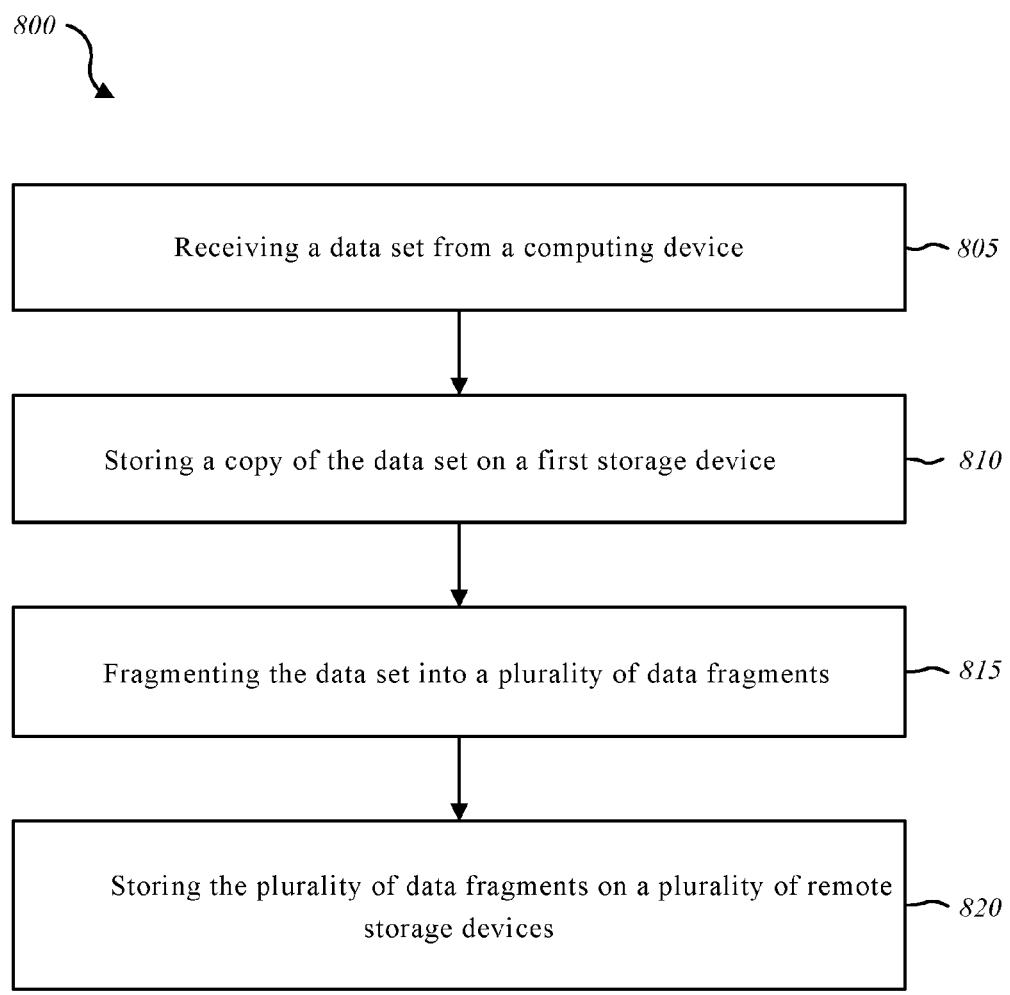
FIG. 8 is a flow diagram illustrating another method for data storage in an automation and security system.

FIG. 8 is a flow diagram illustrating one embodiment a method 800 for backup data storage in an automation and security system. In some configurations, the method 800 may be implemented by the storage module 135 of device 105 shown in FIGS. 1, 2, 3, and/or 4. In other examples, method 800 may be performed generally by device 105 shown in FIGS. 1 and/or 2, or even more generally by the environments 100, 200 shown in FIGS. 1 and/or 2.

Block 805 of method 800 includes receiving data from a computing device. Block 810 includes storing a copy of the data on a first storage device. Block 815 includes fragmenting the data into a plurality of data fragments. Block 810 includes storing the plurality of data fragments on a plurality of remote storage devices.

The method may also include receiving instructions about how to fragment the data set into the plurality of data fragments. The method may include receiving instructions to request the data fragments from the plurality of remote storage devices and reassembling the plurality of data fragments into the data set. The method may include receiving instructions about how to fragment the data set into the plurality of data fragments and where to store the plurality of data fragments on the remotely located control platform. Storing the copy of the data set may include storing in a first portion of the first storage device, and a second portion of the first storage device is dedicated to storage of data fragments from any one of the plurality of remote storage devices.

Figure 9:
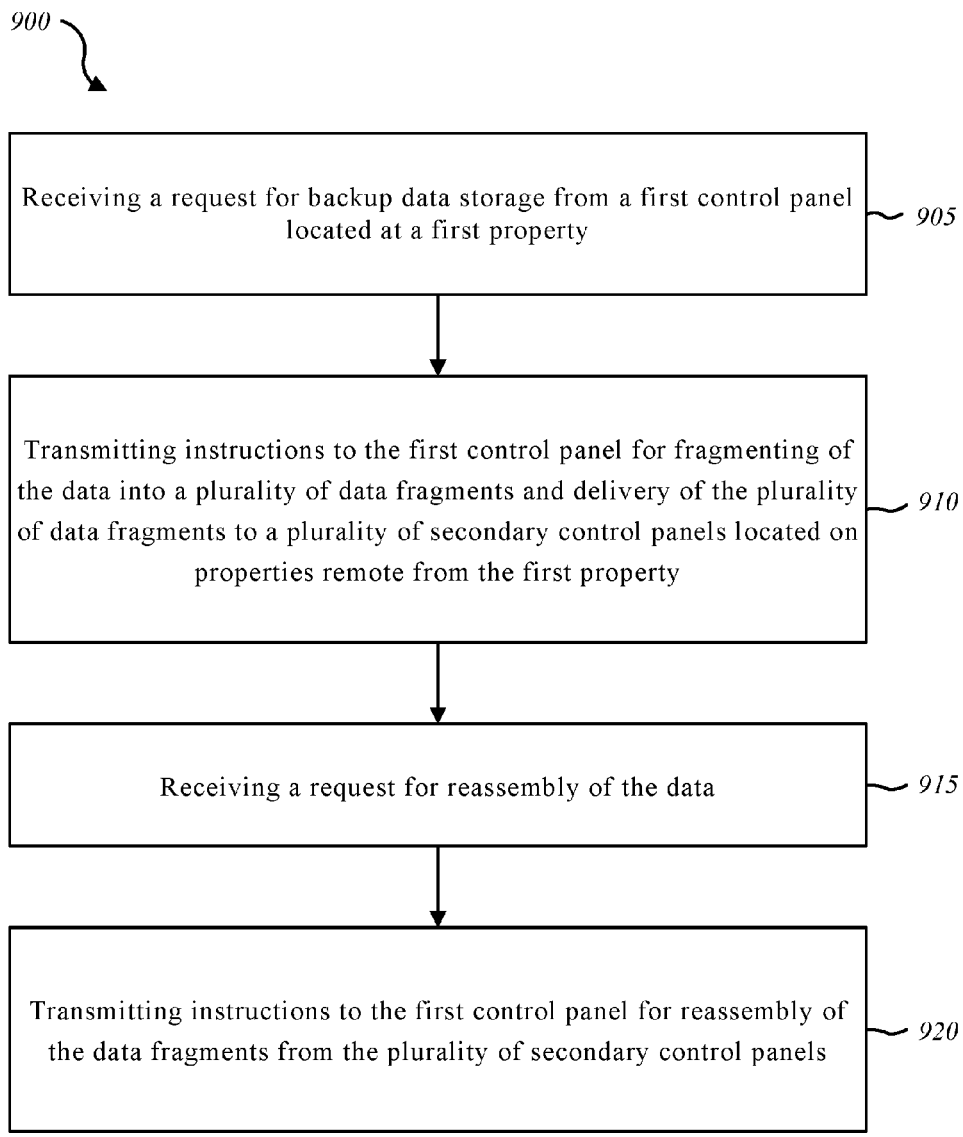
FIG. 9 is a flow diagram illustrating another method for data storage in an automation and security system.

FIG. 9 is a flow diagram illustrating one embodiment of a method 900 for backup data storage. In some configures, the method 900 may be implemented by the control platform shown in FIGS. 1 and/or 2. The method may be particularly suited in the context of an automation and security system. In some configurations, the method 900 may be implemented by the storage module 135 of device 105 shown in FIGS. 1, 2, 3, and/or 4. In other examples, method 900 may be performed generally by device 105 shown in FIGS. 1 and/or 2, or even more generally by the environments 100, 200 shown in FIGS. 1 and/or 2.

Block 905 of method 900 includes receiving a request for backup data storage from a first control panel located at a first property. Block 910 includes transmitting instructions to the first control panel for fragmenting the data into a plurality of data fragments and delivery of the plurality of data fragments to a plurality of secondary control panels located on properties remote from the first property. Block 915 includes receiving a request for reassembly of the data. Block 920 includes transmitting instructions to the first control panel for reassembly of the data fragments from the plurality of secondary control panels.

The method 900 may also include transmitting instructions to the first control panel to request transmission of the data fragments from the secondary control panels to the first control panel. The method 900 ma also include transmitting instructions to send another copy of the data, stored on a different remote storage device, to the first control panel.

The methods described herein may be performed, at least in part, automatically. For example, the computing device 110 of FIGS. 1 and/or 2 may periodically and automatically communicate with device 105 to create backup copies of the data, or portions of the data, held on computing device 110. For example, the data may be emails, photographs, videos, documents, etc. originating from any number of personal computing devices associated with the property being monitored by device 105 and/or environments 100, 200, generally. The backup of data provided by environments 100 and/or 200 may occur at specific times of the day, days of the week, or after a trigger event occurs, such as entry of a computing device onto the property being monitored by device 105. Alternatively, the user may manually initiate the data backup and data storage processes described herein.

Figure 10:
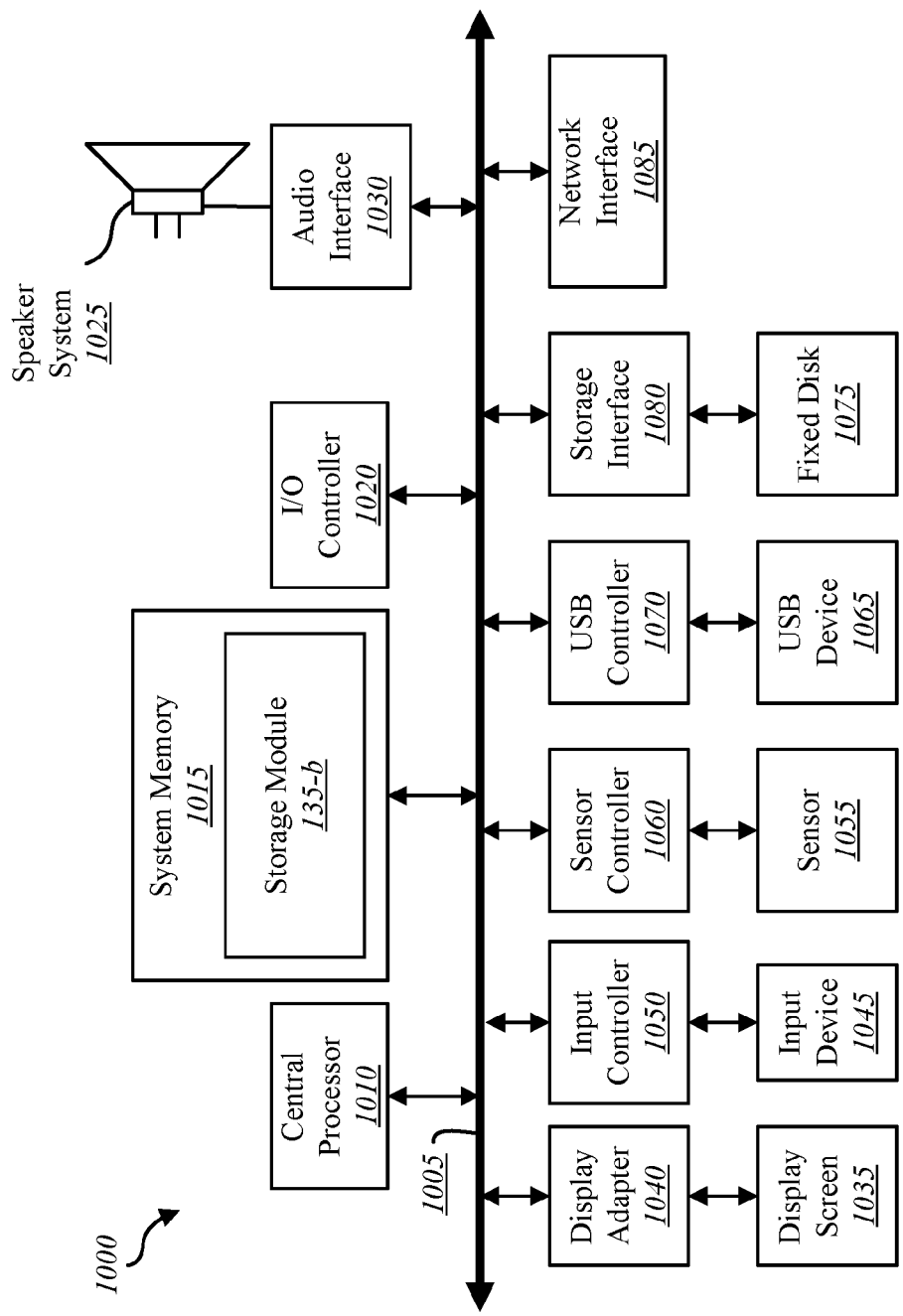
FIG. 10 is a block diagram of a computer system suitable for implementing the present systems and methods of FIGS. 1-9.

FIG. 10 depicts a block diagram of a controller 1000 suitable for implementing the present systems and methods.

The controller 1000 may be an example of the device 105, mobile computing device 225, and/or home automation controller 215 illustrated in FIGS. 1 and/or 2. In one configuration, controller 1000 includes a bus 1005 which interconnects major subsystems of controller 1000, such as a central processor 1015, a system memory 1020 (typically RAM, but which may also include ROM, flash RAM, or the like), an input/output controller 1025, an external audio device, such as a speaker system 1030 via an audio output interface 1035, an external device, such as a display screen 1035 via display adapter 1040, an input device 1045 (e.g., remote control device interfaced with an input controller 1050), multiple USB devices 1065 (interfaced with a USB controller 1070), and a storage interface 1080. Also included are at least one sensor 1055 connected to bus 1005 through a sensor controller 1060 and a network interface 1085 (coupled directly to bus 1005).

Bus 1005 allows data communication between central processor 1015 and system memory 1020, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, a storage module 135-b to implement the present systems and methods may be stored within the system memory 1020. The storage module 135-b may be an example of the storage module 135 illustrated in FIGS. 1, 2 and/or 3. Applications (e.g., application 230) resident with controller 1000 are generally stored on and accessed via a non-transitory computer readable medium, such as a hard disk drive (e.g., fixed disk 1075) or other storage medium. Additionally, applications can be in the form of electronic signals modulated in accordance with the application and data communication technology when accessed via network interface 1085.

Storage interface 1080, as with the other storage interfaces of controller 1000, can connect to a standard computer readable medium for storage and/or retrieval of information, such as a fixed disk drive 1075. Fixed disk drive 1075 may be a part of controller 1000 or may be separate and accessed through other interface systems. Network interface 1085 may provide a direct connection to a remote server via a direct network link to the Internet via a POP (point of presence). Network interface 1085 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 1000 wirelessly via network interface 1085.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 10 need not be present to practice the present systems and methods. The devices and subsystems can be interconnected in different ways from that shown in FIG. 10. The aspect of some operations of a system such as that shown in FIG. 10 are readily known in the art and are not discussed in detail in this application. Code to implement the present disclosure can be stored in a non-transitory computer-readable medium such as one or more of system memory 1020 or fixed disk 1075. The operating system provided on controller 1000 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. An apparatus for backup data storage, comprising:
   a processor;
   a memory in electronic communication with the processor; and
   instructions stored in the memory, the instructions being executable by the processor to cause the apparatus to:
      receive data at a first device over a first wireless network;
      store a copy of the data on the first device;
      fragment the data into a plurality of data fragments;
      transmit the plurality of the data fragments to a plurality of remote devices over a second wireless network different from the first wireless network; and
      initiate storage of some of the plurality of data fragments on each of the plurality of remote devices.

2. The apparatus of claim 1, wherein a data transfer speed of the first wireless network is different from a data transfer speed of the second wireless network.

3. The apparatus of claim 2, wherein, when the data transfer speed of the first wireless network is faster than the data transfer speed of the second wireless network, the instructions are executable by the processor to cause the apparatus to:
   store the plurality of data fragments on the first device prior to initiating storage of at least the portion of at least some of the plurality of data fragments.

4. The apparatus of claim 1, wherein the instructions to receive the data at the first device are executable by the processor to cause the apparatus to:
   receive the data from a mobile device associated with a user.

5. The apparatus of claim 1, wherein the instructions are executable by the processor to cause the apparatus to:
   request the plurality of data fragments from the plurality of remote devices; and
   reassemble the plurality of data fragments based at least in part on requesting the plurality of the data fragments.

6. The apparatus of claim 1, wherein the instructions are executable by the processor to cause the apparatus to:
   determine that the plurality of remote devices are located within a predetermined geographic boundary relative to the first device, wherein the instructions to transmit the plurality of the data fragments to the plurality of remote devices are based at least in part on the determination.

7. The apparatus of claim 1, wherein the instructions to transmit the plurality of the data fragments to the plurality of remote devices are executable by the processor to cause the apparatus to:
   transmit the plurality of the data fragments using a wireless local area network.

8. The apparatus of claim 1, wherein the first device is a television or a control panel.

9. A computer-program product for backup data storage in an automation and security system, the computer-program product comprising a non-transitory computer-readable medium storing instructions executable by a processor to:
   receive data at a first device over a first wireless network;
   store a copy of the data on the first device;
   fragment the data into a plurality of data fragments;
   transmit the plurality of the data fragments to a plurality of remote devices over a second wireless network different from the first wireless network; and
   initiate storage of some of the plurality of data fragments on each of the plurality of remote devices.

10. The computer-program product of claim 9, wherein a data transfer speed of the first wireless network is different from a data transfer speed of the second wireless network.

11. The computer-program product of claim 10, wherein when the data transfer speed of the first wireless network is faster than the data transfer speed of the second wireless network, the instructions are executable the processor to:
    store the plurality of the data fragments on the first device prior to initiating storage of at least the portion of at least some of the plurality of the data fragments on each of the plurality of remote devices.

12. The computer-program product of claim 9, wherein receiving the data at the first device comprises receiving the data from a mobile device associated with a user.

13. The computer-program product of claim 9, wherein the instructions are executable by the processor to:
    request the plurality of the data fragments from the plurality of remote devices; and
    reassemble the plurality of the data fragments based at least in part on requesting the plurality of the data fragments.

14. The computer-program product of claim 9, wherein, prior to transmitting the plurality of the data fragments to the plurality of remote devices, the instructions are executable by the processor to:
    determine that the plurality of remote devices are located within a predetermined geographic boundary relative to the first device, wherein the instructions to transmit the plurality of the data fragments are based at least in part on the determination.

15. A computer-implemented method for backup data storage in an automation and security system, comprising:
    receiving data at a first device over a first wireless network;
    storing a copy of the data on the first device;
    fragmenting the data into a plurality of data fragments;
    transmitting the plurality of the data fragments to a plurality of remote devices over a second wireless network different from the first wireless network; and
    initiate storage of some of the plurality of data fragments on each of the plurality of remote devices.

16. The method of claim 15, further comprising:
    wherein a data transfer speed of the first wireless network is different from a data transfer speed of the second wireless network.

17. The method of claim 16, further comprising:
    determining that the data transfer speed of the first wireless network is faster than the data transfer speed of the second wireless network; and
    storing the plurality of the data fragments on the first device prior to initiating storage of at least the portion of at least some of the plurality of data fragments.

18. The method of claim 15, wherein receiving the data at the first device comprises receiving the data from a mobile device associated with a user.

19. The method of claim 15, further comprising:
requesting the plurality of the data fragments from the plurality of remote devices; and
reassembling the plurality of the data fragments based at least in part on requesting the plurality of the data fragments.

20. The method of claim 15, further comprising:
determining, prior to transmitting the plurality of the data fragments to the plurality of remote devices, that the plurality of remote devices are located within a predetermined geographic boundary relative to the first device, wherein transmitting the plurality of the data fragments is based at least in part on the determination.

* * * * *